(12) United States Patent
Abe et al.

(10) Patent No.: US 6,999,260 B2
(45) Date of Patent: Feb. 14, 2006

(54) SHOCK DETECTION DEVICE, DISK DRIVE, SHOCK DETECTION METHOD, AND SHOCK DETECTION PROGRAM

(75) Inventors: Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/801,403

(22) Filed: Mar. 16, 2004

(65) Prior Publication Data
US 2004/0252401 A1    Dec. 16, 2004

(30) Foreign Application Priority Data
Jun. 13, 2003    (JP)  ............... 2003-168632

(51) Int. Cl.
*G11B 15/04*    (2006.01)
(52) U.S. Cl. .............. 360/60; 360/31; 360/75; 360/25
(58) Field of Classification Search ............ 360/60
See application file for complete search history.

(56) References Cited

U.S. PATENT DOCUMENTS

| | | | | |
|---|---|---|---|---|
| 6,018,431 A | * | 1/2000 | Carlson et al. | ............... 360/60 |
| 6,178,058 B1 | * | 1/2001 | Pan et al. | ..................... 360/60 |
| 6,226,140 B1 | * | 5/2001 | Serrano et al. | ............... 360/60 |
| 6,510,014 B1 | * | 1/2003 | Kikuta et al. | ................. 360/60 |
| 6,683,737 B1 | * | 1/2004 | Gong et al. | ................... 360/31 |
| 6,735,033 B1 | * | 5/2004 | Codilian et al. | ............. 360/60 |
| 6,744,577 B1 | * | 6/2004 | Guo et al. | ..................... 360/31 |
| 2003/0103286 A1 | * | 6/2003 | Bi et al. | ....................... 360/60 |

FOREIGN PATENT DOCUMENTS

JP    6-333325    12/1994

* cited by examiner

*Primary Examiner*—David Hudspeth
*Assistant Examiner*—Dismery Mercedes
(74) *Attorney, Agent, or Firm*—Greer, Burns & Crain, Ltd.

(57) ABSTRACT

A shock detection device can detect a slight shock without mis-detection of shocks due to noise in a shock sensor signal. The shock detection device is adapted to output a shock detection signal for stopping writing into a disk medium when a shock applied to the disk medium satisfies a prescribed condition. The shock detection device includes a shock sensor that detects a shock applied to the disk medium and outputs a corresponding shock sensor signal, a variable shock detection slice value setting part that sets a threshold for the shock sensor signal based on a position error signal, a shock sensor signal correction part that outputs, as a new shock sensor signal, a signal by removing noise generated in synchronization with writing from the shock sensor signal, and a shock determining part that outputs a shock detection signal when the shock sensor signal exceeds the variable shock detection slice value.

8 Claims, 5 Drawing Sheets

SHOCK DETECTION DEVICE, DISK DRIVE, SHOCK DETECTION METHOD, AND SHOCK DETECTION PROGRAM

BACKGROUND OF THE INVENTION

1. Field of the Invention

The present invention relates to a shock detection device, a shock detection method, a shock detection program and a disk drive equipped with such a shock detection device, for detecting a shock applied to a magnetic disk drive or the like.

2. Description of the Related Art

Magnetic disk drives available for mobile use are generally provided with a shock detection device for detecting a shock from the outside in consideration of use environments. The magnetic disk drives are constructed in such a manner that they stop writing data upon detection of a shock from the outside.

Figure 7:
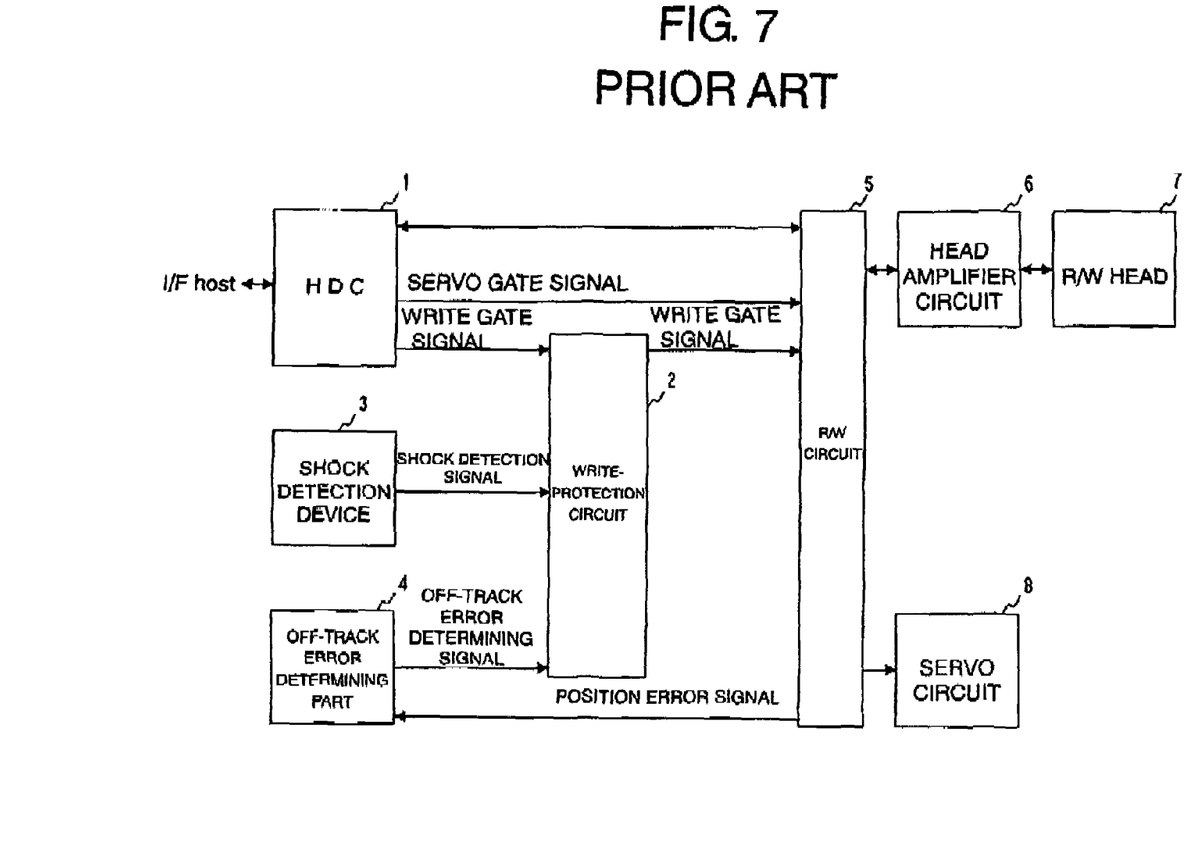
FIG. 7 is a block diagram showing one example of the configuration of a known magnetic disk drive.

FIG. 7 is a block diagram that shows one example of the configuration of a known magnetic disk drive. As shown in FIG. 7, the known magnetic disk drive includes an HDC (Hard Disc Controller) 1, a write-protection circuit 2, a shock detection device 3, an off-track error determining part 4, an R/W (Read/Write) circuit 5, a head amplifier circuit 6, an R/W head 7, and a servo circuit 8.

Figure 8:
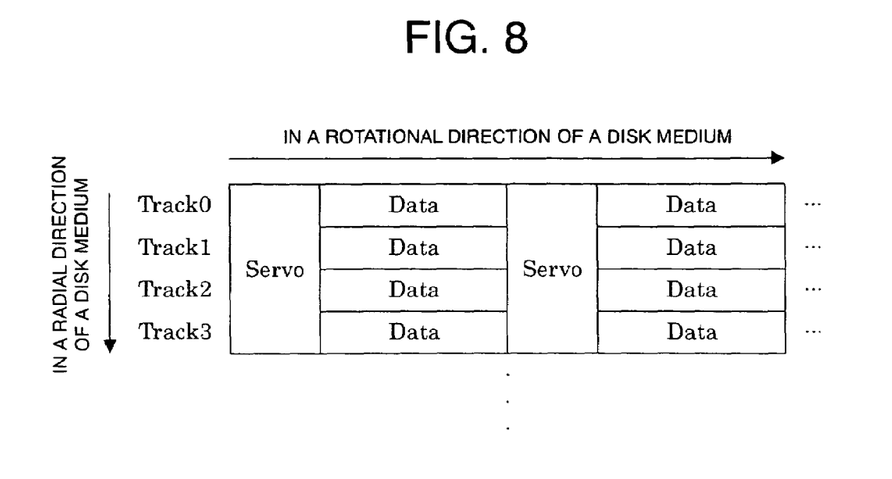
FIG. 8 is a view showing the arrangement of servo areas and data areas on a magnetic disk medium.

Here, reference will be made to the organization of data on a magnetic disk medium using a data surface servo system. FIG. 8 is a view showing the arrangement of servo areas and data areas on the magnetic disk medium. As shown in FIG. 8, a plurality of tracks exist on the magnetic disk medium in a radial direction thereof, and the servo areas and the data areas are also arranged on the medium alternately in a rotational direction thereof.

The information of radial locations of the disk medium is successively written beforehand in the servo areas in a radial direction of the disk medium. If the servo areas are decoded in any radial position of the disk medium, a position error signal can be acquired. The position error signal represents a relative position in a radial direction of the disk medium from the center of a target track. Each time a servo area in the rotational direction of the disk medium is detected, the decoding of that servo area is executed. The interval of decoding the successive servo areas is a servo sampling interval.

Next, reference will be made to the operation of the known magnetic disk drive. When the HDC 1 receives a read/write instruction for reading or writing data from an I/F (Interface) host, it outputs a control signal for controlling the R/W circuit 5 and data from the I/F host to the R/W circuit 5 in the case of writing, whereas it outputs a control signal for controlling the R/W circuit 5 to the R/W circuit 5, and data from the R/W circuit 5 to the I/F host in the case of reading.

In addition, the HDC 1 outputs a servo gate signal representative of the timing of driving the servo circuit 8 to the R/W circuit 5. Also, upon writing data, the HDC 1 outputs a write gate signal representative of the timing at which data is written into the magnetic disk medium to the write-protection circuit 2.

Upon detecting a shock from the outside, the shock detection device 3 outputs a shock detection signal to the write-protection circuit 2.

When there takes place an off-track error, the off-track error determining part 4 outputs an off-track error determining signal to the write-protection circuit 2. An off-track error means that the R/W head 7 comes off from a target track to another track, and when a position error signal exceeds an off-track error slice value, it is determined that an off-track error has occurred.

The write-protection circuit 2 determines, based on the shock detection signal and the off-track error determining signal, whether a write gate signal is output from the HDC 1 to the R/W circuit 5. Upon receiving the write-protection signal from the off-track error determining part 4 or the shock detection signal from the shock detection device 3, the write-protection circuit 2 determines that the disk drive is in a condition unsuitable for writing, and stops outputting the write gate signal to the R/W circuit 5, whereas the write-protection circuit 2 outputs the write gate signal from the HDC 1 to the R/W circuit 5 at other times.

The R/W circuit 5 drives the servo circuit 8 in accordance with the timing of the servo gate signal and the control signal from the HDC 1. The servo circuit 8 performs the positioning of the R/W head 7, etc.

Thereafter, the R/W circuit 5 performs the reading or writing of data by means of the head amplifier circuit 6 and the R/W head 7 in accordance with the timing of the write gate signal and the control signal. Additionally, the R/W circuit 5 outputs the position error signal reproduced from the R/W head 7 to the off-track error determining part 4.

Figure 9:
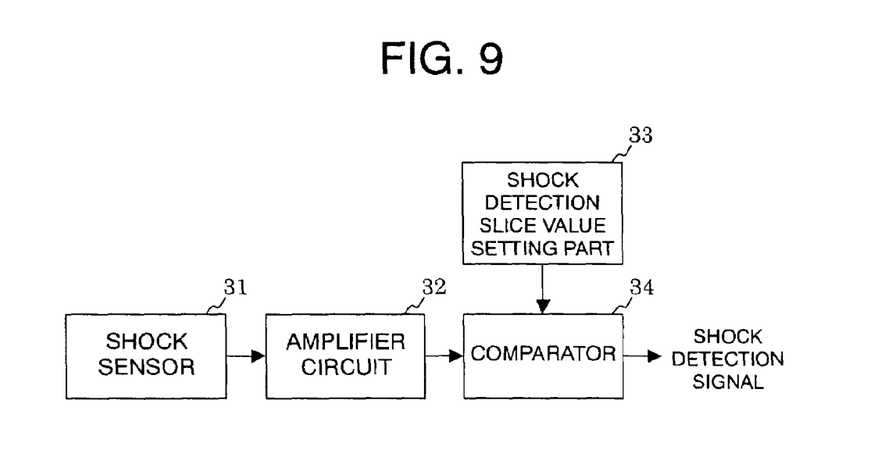
FIG. 9 is a block diagram showing one example of the configuration of a known shock detection device.

Now, reference will be made to the configuration of the known shock detection device. FIG. 9 is a block diagram showing one example of the configuration of the known shock detection device. As shown in FIG. 9, the known shock detection device 3 includes a shock sensor 31, an amplifier circuit 32, a shock detection slice value setting part 33, and a comparator 34.

Next, reference will be made to the operation of the known shock detection device. The shock sensor 31 is comprised of a piezoelectric element that serves to convert an acceleration into a corresponding voltage for instance, and it detects a shock applied thereto from the outside and outputs a corresponding voltage to the amplifier circuit 32.

The amplifier circuit 32 amplifies the output of the shock sensor 31 by a prescribed value, and outputs it to the comparator 34 as a shock sensor signal.

The shock detection slice value setting part 33 is comprised of an MPU (Micro Processing Unit) for instance, and it sets a shock detection slice value, which is a threshold for the shock sensor signal 31, and outputs it to the comparator 34.

The comparator 34 makes a comparison between the shock sensor signal and the shock detection slice value, and outputs a shock detection signal to the write-protection circuit 2 when the shock sensor signal exceeds the shock detection slice value. In the above manner, the known shock detection device 3 detects a shock from the outside.

Moreover, there has also been known another disk drive equipped with a shock sensor in which the frequency dependence of a shock sensor output can be reduced, thereby decreasing errors in the operation of stopping writing and providing shock protection of data in an accurate manner (for example, see a first patent document: Japanese patent application laid-open No. H06-333325 (pages 3 and 4, and FIG. 1)).

In the above-mentioned known shock detection device as shown in FIG. 9, however, there arises a problem that if the shock detection slice value is set to be low so as to detect a slight or weak shock, mis-detection of a shock might be caused due to noise in the shock sensor signal, resulting in reduced writing performance.

Therefore, in the known shock detection device, the shock detection slice value is generally set to be high. In this case, however, there arises another problem that if a position error signal generated upon application of a slight shock to the disk drive fails to be detected between servo samplings, writing might be carried out off-track or out of a target track, thus resulting in the deletion of data on an adjacent track.

SUMMARY OF THE INVENTION

Accordingly, the present invention has been made in view of the problems as referred to above, and has for its object to provide a shock detection device, a shock detection method, a shock detection program and a disk drive equipped with a shock detection device, in which a slight shock can be detected without mis-detecting shocks due to noise in a shock sensor signal.

In order to solve the above-mentioned problems, according to one aspect of the present invention, there is provided a shock detection device adapted to output a shock detection signal for stopping writing into a disk medium when a shock applied to the disk medium satisfies a prescribed condition, the shock detection device comprising: a shock sensor that detects a shock applied to the disk medium and outputs a corresponding shock sensor signal; a variable shock detection slice value setting part that sets a variable shock detection slice value, which is a threshold for the shock sensor signal, based on a position error signal representative of the relative position of the disk medium in a radial direction thereof from the center of a target track of the disk medium; and a shock determining part that outputs a shock detection signal when the shock sensor signal exceeds the variable shock detection slice value.

With such a configuration, by changing the shock detection slice value in accordance with the position error signal, the mis-detection of shock can be reduced, and at the same time a slight shock can be detected.

Preferably, the variable shock detection slice value setting part sets the variable shock detection slice value in such a manner that the smaller the absolute value of the position error signal, the larger does the variable shock detection slice value become.

With such a configuration, by setting the shock detection slice value in accordance with the position error signal, it is possible to detect a slight shock, which would be a problem when the position error signal is large in magnitude.

Preferably, the shock determining part does not output the shock detection signal when the absolute value of the position error signal is in a prescribed range.

With such a configuration, by not outputting a shock detection signal when the absolute value of the position error signal is small in magnitude, the mis-detection of a shock generated due to large power supply ripples can be reduced, thus making it possible to reduce an influence on the writing performance owing to a power supply condition.

Preferably, the shock detection device further comprises a shock sensor signal correction part that outputs, as a new shock sensor signal, a signal by removing noise generated in synchronization with writing from the shock sensor signal.

With such a configuration, by removing the noise generated in synchronization with writing from the shock sensor signal, the mis-detection of shock can be reduced, and at the same time a slight shock can be detected.

According to another aspect of the present invention, there is provided a shock detection device adapted to output a shock detection signal for stopping writing into a disk medium when a shock applied to the disk medium satisfies a prescribed condition, the shock detection device comprising: a shock sensor that detects a shock applied to the disk medium and outputs a corresponding shock sensor signal; a shock sensor signal correction part that outputs a corrected shock sensor signal by removing noise generated in synchronization with writing from the shock sensor signal; and a shock determining part that outputs a shock detection signal when the corrected shock sensor signal exceeds a prescribed shock detection slice value.

With such a configuration, by removing the noise generated in synchronization with writing, the mis-detection of shock can be reduced, and at the same time a slight shock can be detected.

Preferably, the noise is extracted by averaging a plurality of shock sensor signal outputs acquired in synchronization with the timing of the writing.

With such a configuration, by averaging the past shock sensor signal outputs, the noise generated in synchronization with writing can be easily extracted.

According to a further aspect of the present invention, there is provided a disk drive adapted to stop writing when a shock satisfies a prescribed condition, the disk drive comprising: a control part that outputs data input from outside and the timing of writing at the time of writing the data; a disk medium into which the data is written; an R/W head that performs writing or reading with respect to the disk medium; an R/W circuit that reads the position error signal from an output of the R/W head, and outputs data from the control part to the R/W head in accordance with the timing of writing from the control part; a shock detection device according to claim 1 that outputs the shock detection signal when a shock applied to the disk medium satisfies the prescribed condition; and a write-protection circuit that stops the timing of writing from the control part when the shock detection signal is input thereto from the shock detection device.

With such a configuration, by improving the accuracy of shock detection, it is possible to prevent writing into the disk medium that is placed by application of a shock into a condition unsuitable for writing. Here, note that the control part in an embodiment of the invention comprises an HDC 1.

According to a still further aspect of the present invention, there is provided a shock detection method adapted to output a shock detection signal for stopping writing into a disk medium when a shock applied to the disk medium satisfies a prescribed condition, the shock detection method comprising the steps of: detecting a shock applied to the disk medium and outputting a corresponding shock sensor signal; setting a variable shock detection slice value, which is a threshold for the shock sensor signal, based on a position error signal representative of the relative position of the disk medium in a radial direction thereof from the center of a target track of the disk medium; and generating a new shock sensor signal by removing noise generated in synchronization with writing from the shock sensor signal; and outputting a shock detection signal when the new shock sensor signal exceeds the variable shock detection slice value.

According to a yet further aspect of the present invention, there is provided a shock detection program for making a computer execute a shock detection method of outputting a shock detection signal for stopping writing into a disk medium when a shock applied to the disk medium satisfies a prescribed condition, the shock detection program being operable to make the computer perform; a step of detecting a shock applied to the disk medium and outputting a corresponding shock sensor signal; a step of setting a variable shock detection slice value, which is a threshold for the shock sensor signal, based on a position error signal representative of the relative position of the disk medium in a radial direction thereof from the center of a target track of the disk medium; a step of generating a new shock sensor signal by removing noise generated in synchronization with writing from the shock sensor signal; and a step of outputting a shock detection signal when the shock sensor signal exceeds the variable shock detection slice value.

Here, note that in the above shock detection program, the computer readable recording medium includes, in addition to a semiconductor memory such as a ROM, a RAM and the like, a portable storage medium such as a CD-ROM, a flexible disk, a DVD disk, a magneto-optical disk, an IC card or the like, or a database that holds therein computer programs, or another computer and its database, or a transmission medium on a communication line.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

Figure 1:
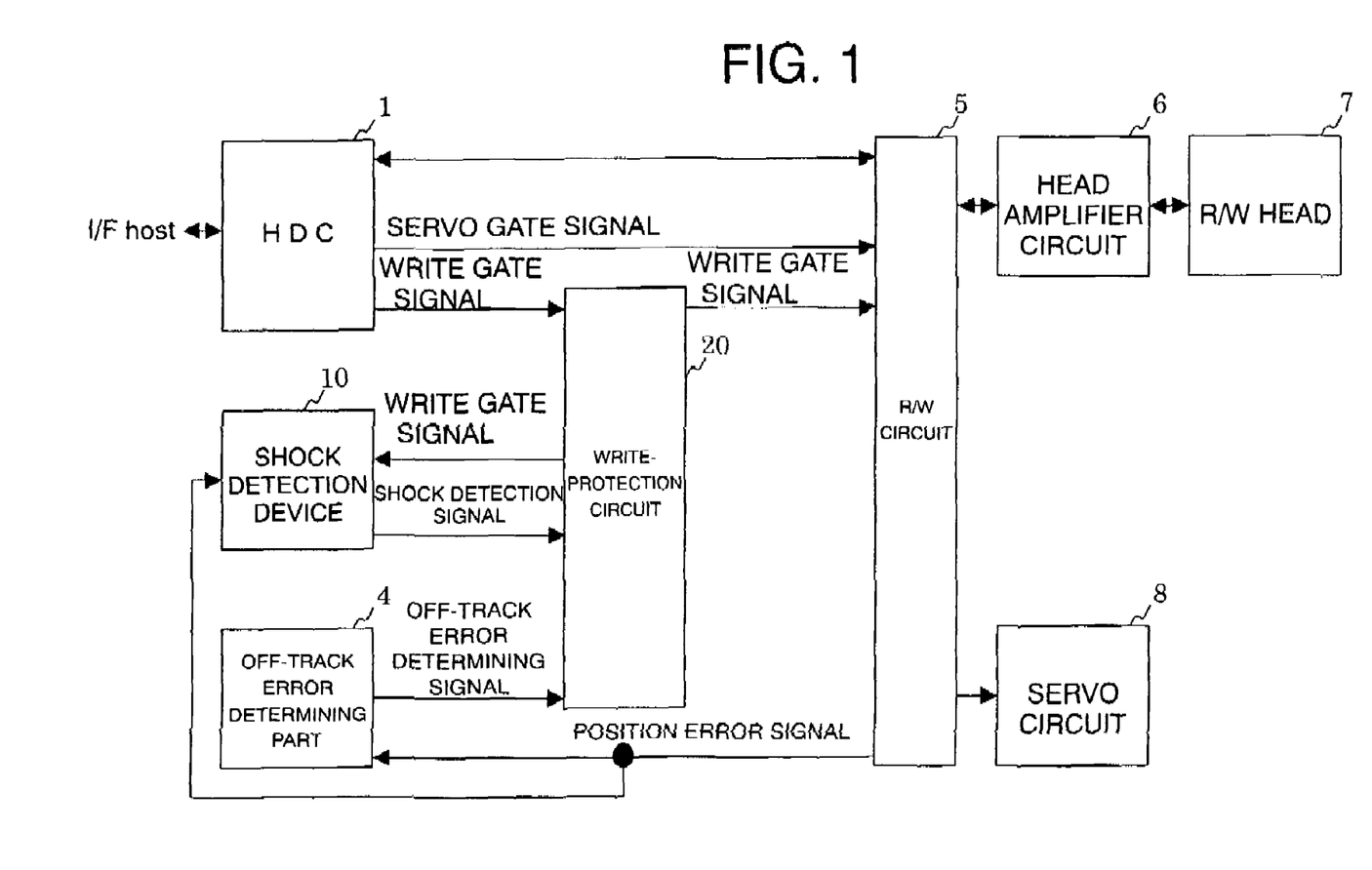
FIG. 1 is a block diagram showing one example of the configuration of a magnetic disk drive according to an embodiment of the invention.

Hereinafter, a preferred embodiments of the present invention will be described in detail while referring to the accompanying drawings. In this embodiment, a magnetic disk drive will be described as one example of a disk drive. FIG. 1 is a block diagram that shows one example of the configuration of the magnetic disk drive according to the present invention. The magnetic disk drive according to the embodiment of the present invention has a configuration similar to that shown in FIG. 7, but it is provided with a shock detection device 10 instead of the shock detection device 3, and it is also provided with a write-protection circuit 20 instead of the write-protection circuit 2. In FIG. 1, the blocks with the same symbols as those in FIG. 7 represent the same ones as the blocks shown in FIG. 7, and hence an explanation thereof is omitted.

Figure 2:
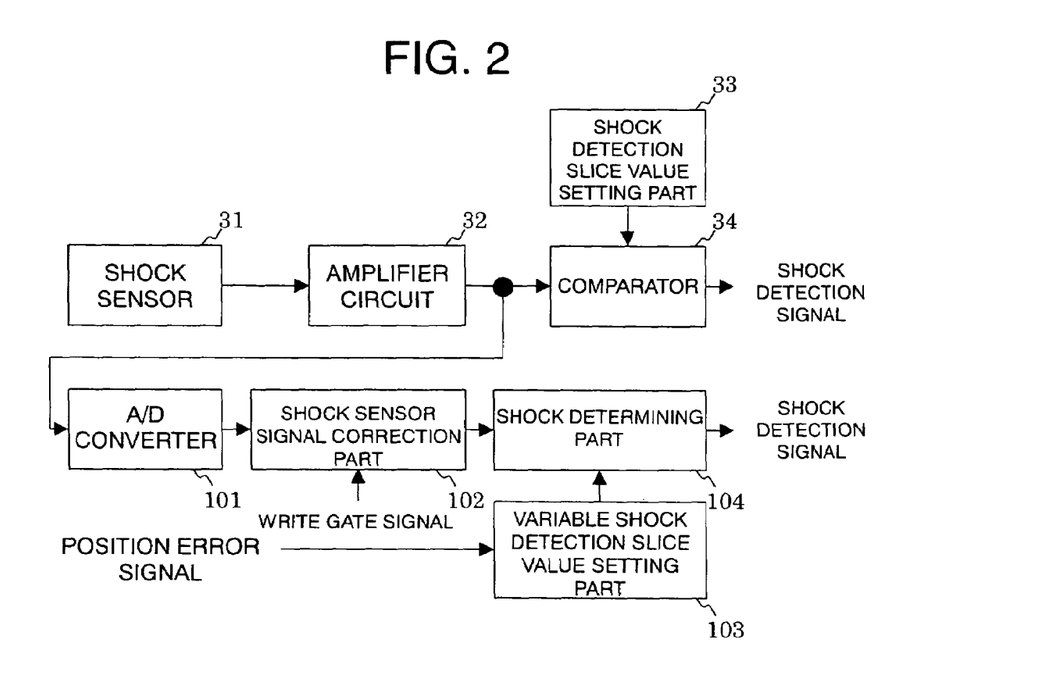
FIG. 2 is a block diagram showing one example of the configuration of a shock detection device according to the embodiment of the invention.

Hereinafter, the shock detection device according to the present invention will be described. FIG. 2 is a block diagram that shows one example of the configuration of the shock detection device according to the embodiment of the invention. As shown in FIG. 2, the shock detection device of the present invention includes, in addition to the configuration of FIG. 9, an A/D converter 101, a shock sensor signal correction part 102, a variable shock detection slice value setting part 103, and a shock determining part 104. In FIG. 2, the blocks with the same symbols as those in FIG. 9 represent the same ones as the blocks shown in FIG. 9, and hence an explanation thereof is omitted.

Now, reference will be made to the operation of the A/D converter 101, the shock sensor signal correction part 102, the variable shock detection slice value setting part 103 and the shock determining part 104, all of which are freshly included by the shock detection device of the present invention. The shock sensor signal correction part 102, the variable shock detection slice value setting part 103 and the shock determining part 104 in this embodiment are constituted by an MPU, for example.

First of all, the A/D converter 101 takes in a shock sensor signal output from the amplifier circuit 32, converts it from analog into digital form, and outputs it to the shock sensor signal correction part 102.

The shock sensor signal correction part 102 takes in shock sensor signal outputs a plurality of times in synchronization with a write gate signal output from the write-protection circuit 20 to the R/W circuit 5, generates an average shock sensor signal by averaging a plurality of past shock sensor signal outputs, and also generates a corrected shock sensor signal by removing the average shock sensor signal from the current shock sensor signal, and outputs the corrected shock sensor signal thus obtained to the shock determining part 104. Details of the average shock sensor signal and the corrected shock sensor signal will be described later.

Next, the variable shock detection slice value setting part 103 takes in a position error signal output from the R/W circuit 5, sets a variable shock detection slice value corresponding to the position error signal, and outputs it to the shock determining part 104. Details of the setting of the variable shock detection slice value according to the position error signal will be described later.

Subsequently, the shock determining part 104 makes a comparison between the corrected shock sensor signal and the variable shock detection slice value, and if the corrected shock sensor signal exceeds the variable shock detection slice value, the shock determining part 104 outputs the shock detection signal to the write-protection circuit 20.

Then, when either one of the off-track error detection signal from the off-track error determining part 4, the shock detection signal from the comparator 34 and the shock detection signal from the shock determining part 104 is input, the write-protection circuit 20 makes a determination that the magnetic disk drive is in a condition unsuitable for writing, and stops outputting the write gate signal to the R/W circuit 5.

Figure 3:
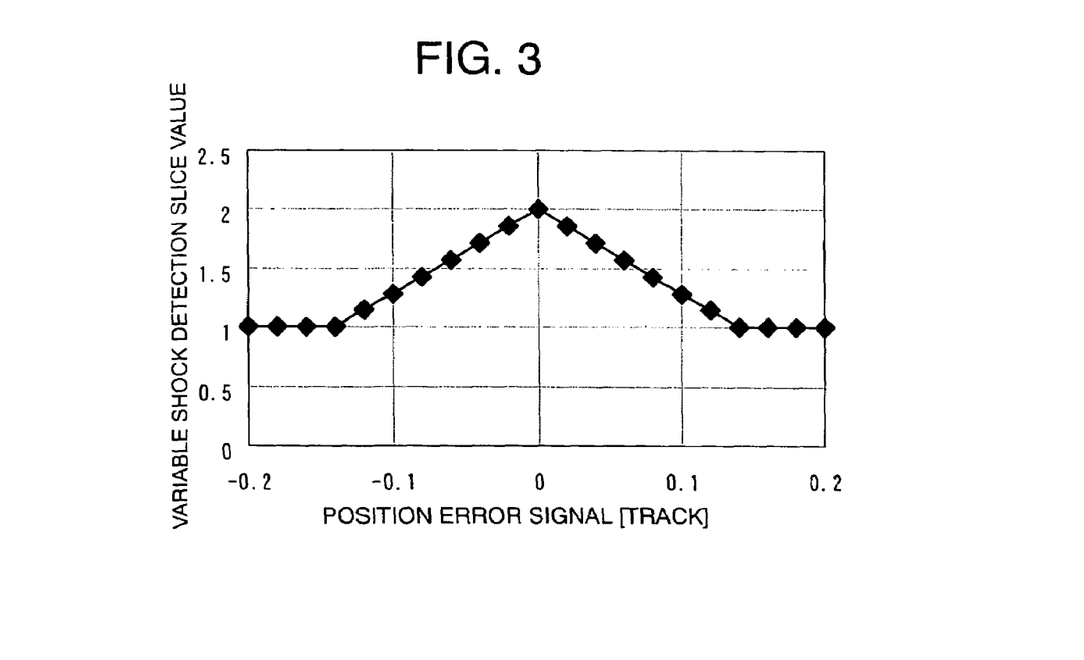
FIG. 3 is a view showing one example of a variable shock detection slice value set according to a position error signal.

Now, detail reference will be made to the setting of the variable shock detection slice value according to the position error signal. FIG. 3 is a view that shows one example of the variable shock detection slice value set according to the position error signal. In this embodiment, as an example of the easiest setting, the setting is made such that the smaller the absolute value of the position error signal, the greater does the variable shock detection slice value become, as shown in and FIG. 3.

When the absolute value of the position error signal is greater than a prescribed value, the variable shock detection slice value may be fixed. This is because when the variable shock detection slice value is too strict, mis-detection due to noise is caused, whereas when the position error signal becomes equal to or greater than the off-track error slice value, writing is stopped by the off-track error determining part.

The average shock sensor signal and the corrected shock sensor signal will then be described in detail. The shock sensor signal correction part 102 removes the noise for which the condition of noise generation is known beforehand. In general, magnetic disk drives have a disposition to generate noise in synchronization with the start of writing, and hence in this embodiment, description will be made to an example of correcting the shock sensor signal so as to remove such noise at the start of writing.

Figure 4:
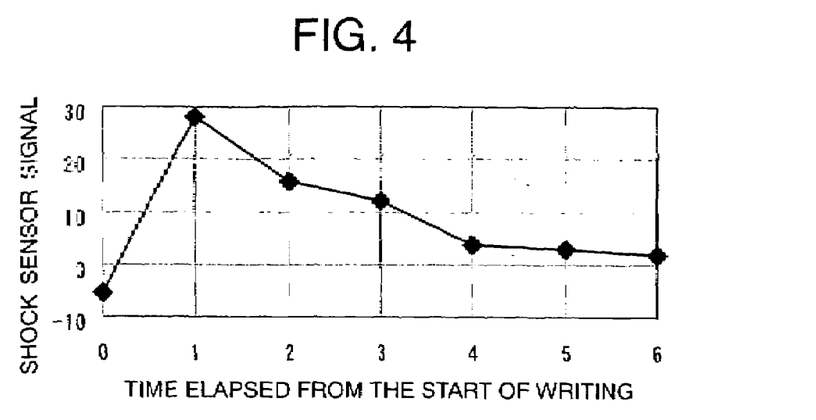
FIG. 4 is a view showing one example of a shock sensor signal with respect to the time elapsed from the start of writing.

FIG. 4 is a view that shows one example of the shock sensor signal with respect to the time elapsed from the start of writing. As shown in FIG. 4, noise in the shock sensor signal varies greatly immediately after the start of writing, and it settles or converges over time. Each time writing is carried out, the shock sensor signal correction part 102 stores the shock sensor signal from the start of writing into a RAM in the shock sensor signal correction part 102 in synchronization with the timing of writing, i.e., the write gate signal.

Figure 5:
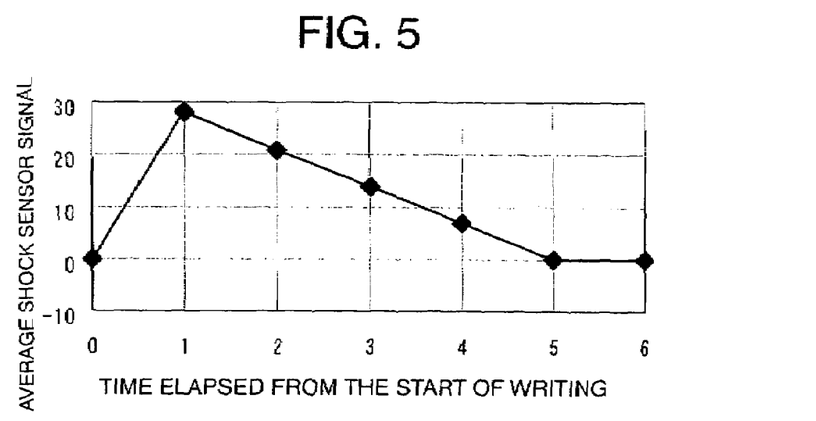
FIG. 5 is a view showing one example of an average shock sensor signal with respect to the time elapsed from the start of writing.

Then, the shock sensor signal correction part 102 extracts only the noise generated upon starting of writing to obtain an average shock sensor signal by averaging the plurality of the past shock sensor signal outputs. FIG. 5 is a view that shows one example of the average shock sensor signal with respect to the time elapsed from the start of writing.

Figure 6:
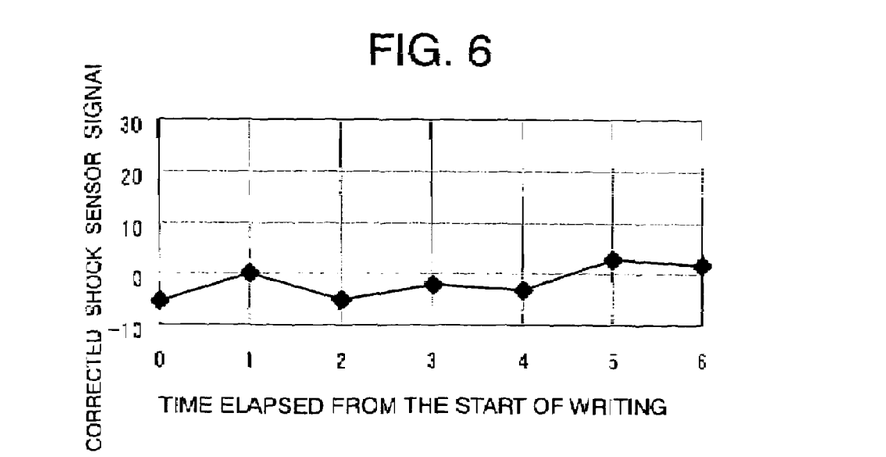
FIG. 6 is a view showing one example of a corrected shock sensor signal with respect to the time elapsed from the start of writing.

Subsequently, the shock sensor signal correction part 102 generates a corrected shock sensor signal by removing the average shock sensor signal from the current shock sensor signal. FIG. 6 is a view that shows one example of the corrected shock sensor signal of time from the writing starting. Thus, the corrected shock sensor signal thus generated by the removal of noise from the shock sensor signal is used for comparison with the variable shock detection slice value.

As described above, by setting the shock detection slice value in accordance with the position error signal, it becomes possible to detect a slight or weak shock which would be a problem when the position error signal is large. In addition, by removing the noise in the shock sensor signal, it is possible to prevent mis-detection of shocks due to the noise.

Further, in this embodiment, when the corrected shock sensor signal exceeds the variable shock detection slice value, the shock detection signal is output to the write-protection circuit 20. However, the shock detection device may be configured such that even if the shock determining part 104 detects a shock, the shock detection signal is not output when the absolute value of the position error signal does not exceed a prescribed value. With such a configuration, the mis-detection of shock due to large power supply ripples or the like can be reduced, thus making it possible to decrease the influence on the writing performance due to a power supply condition.

Furthermore, this embodiment is configured in such a manner that the noise generated in synchronization with writing is removed from the shock sensor signal, and at the same time the shock detection slice value is changed in accordance with the position error signal. However, the shock sensor signal correction part 102 may be omitted, and the noise in the shock sensor signal is not removed. Alternatively, instead of the variable shock detection slice value setting part 103, provision may be made for a fixed shock detection slice value setting part for setting a fixed shock detection slice value.

Although in this embodiment, description has been made by using the magnetic disk drive equipped with the shock detection device, the shock detection device of the present invention can be applied to other disk drives for optical disks, magneto-optical disks, etc.

As described above in detail, according to the present invention, a slight shock can be detected by setting the shock detection slice value in accordance with the position error signal. In addition, the accuracy of shock detection can be improved by removing the noise generated at the start of writing.

Moreover, by extracting the noise from the past shock sensor signal, it is possible to enhance the accuracy of shock detection irrespective of differences in environments, the states of power supplies, etc. As a result, when writing is carried out on a target track, it is possible to reduce serious problems such as deletion or erasure of data on an adjacent track.

While the invention has been described in terms of a preferred embodiment, those skilled in the art will recognize that the invention can be practiced with modifications within the spirit and scope of the appended claims.

What is claimed is:

1. A shock detection device adapted to output a shock detection signal for stopping writing into a disk medium when a shock applied to said disk medium satisfies a prescribed condition, said shock detection device comprising:

a shock sensor that detects a shock applied to said disk medium and outputs a corresponding shock sensor signal;

a variable shock detection slice value setting part that sets a variable shock detection slice value, which is a threshold for said shock sensor signal, based on a position error signal representative of the relative position of said disk medium in a radial direction thereof from the center of a target track of said disk medium; and a shock determining part that outputs a shock detection signal when said shock sensor signal exceeds said variable shock detection slice value, wherein said variable shock detection slice value setting part sets said variable shock detection slice value in such a manner that the smaller the absolute value of said position error signal, the larger said variable shock detection slice value becomes.

2. The shock detection device according to claim 1, wherein said shock determining part does not output the shock detection signal when the absolute value of said position error signal is in a prescribed range.

3. A shock detection device adapted to output a shock detection signal for stopping writing into a disk medium when a shock applied to said disk medium satisfies a prescribed condition, said shock detection device comprising:

a shock sensor that detects a shock applied to said disk medium and outputs a corresponding shock sensor signal;

a variable shock detection slice value setting part that sets a variable shock detection slice value, which is a threshold for said shock sensor signal, based on a position error signal representative of the relative position of said disk medium in a radial direction thereof from the center of a target track of said disk medium;

a shock determining part that outputs a shock detection signal when said shock sensor signal exceeds said variable shock detection slice; and a shock sensor signal correction part that outputs, as a new shock sensor signal, a signal by removing noise generated in synchronization with writing from said shock sensor signal.

4. The shock detection device as set forth in claim 3, wherein said noise is extracted by averaging a plurality of shock sensor signal outputs acquired in synchronization with the timing of said writing.

5. A shock detection device adapted to output a shock detection signal for stopping writing into a disk medium when a shock applied to said disk medium satisfies a prescribed condition, said shock detection device comprising:

a shock sensor that detects a shock applied to said disk medium and outputs a corresponding shock sensor signal;

a shock sensor signal correction part that outputs a corrected shock sensor signal by removing noise generated in synchronization with writing from said shock sensor signal; and a shock determining part that outputs a shock detection signal when said corrected shock sensor signal exceeds a prescribed shock detection slice value.

6. A disk drive adapted to stop writing when a shock satisfies a prescribed condition, said disk drive comprising:

a control part that outputs data input from an outside interface and that also outputs the timing of writing at the time of writing the data;

a disk medium into which the data is written;

an R/W head that performs writing or reading with respect to said disk medium;

an R/W circuit that reads said position error signal from an output of said R/W head, and outputs data from said control part to said R/W head in accordance with the timing of writing from said control part;

a shock detection device including:

a shock sensor that detects a shock applied to said disk medium and outputs a corresponding shock sensor signal;

a variable shock detection slice value setting part that sets a variable shock detection slice value, which is a threshold for said shock sensor signal, based on a position error signal representative of the relative position of said disk medium in a radial direction thereof from the center of a target track of said disk medium; and a shock determining part that outputs a shock detection signal when said shock sensor signal exceeds said variable shock detection slice value, wherein said shock detection device outputs said shock detection signal when a shock applied to said disk medium satisfies said prescribed condition; and wherein said disk drive further comprises a write-protection circuit that stops the timing of writing from said control part when said shock detection signal is input thereto from said shock detection device.

7. A shock detection method adapted to output a shock detection signal for stopping writing into a disk medium when a shock applied to said disk medium satisfies a prescribed condition, said shock detection method comprising the steps of:

detecting a shock applied to said disk medium and outputting a corresponding shock sensor signal;

setting a variable shock detection slice value, which is a threshold for said shock sensor signal, based on a position error signal representative of the relative position of said disk medium in a radial direction thereof from the center of a target track of said disk medium; and generating a new shock sensor signal by removing noise generated in synchronization with writing from said shock sensor signal; and outputting a shock detection signal when said new shock sensor signal exceeds said variable shock detection slice value.

8. A shock detection program for making a computer execute a shock detection method of outputting a shock detection signal for stopping writing into a disk medium when a shock applied to said disk medium satisfies a prescribed condition, said shock detection program being operable to make the computer perform;

a step of detecting a shock applied to said disk medium and outputting a corresponding shock sensor signal;

a step of setting a variable shock detection slice value, which is a threshold for said shock sensor signal, based on a position error signal representative of the relative position of said disk medium in a radial direction thereof from the center of a target track of said disk medium;

a step of generating a new shock sensor signal by removing noise generated in synchronization with writing from said shock sensor signal; and a step of outputting a shock detection signal when said shock sensor signal exceeds said variable shock detection slice value.

* * * * *